(12) United States Patent
Monnerie et al.

(10) Patent No.: US 8,081,673 B2
(45) Date of Patent: Dec. 20, 2011

(54) SYSTEMS AND METHODS FOR PROCESSING SPREAD SPECTRUM SIGNALS

(75) Inventors: Emmanuel Monnerie, Suwanee, GA (US); Ruben E. Salazar Cardozo, Alpharetta, GA (US)

(73) Assignee: Cellnet Innovations, Inc., Alpharetta, GA (US)

( * ) Notice: Subject to any disclaimer, the term of this patent is extended or adjusted under 35 U.S.C. 154(b) by 497 days.

(21) Appl. No.: 12/325,412

(22) Filed: Dec. 1, 2008

(65) Prior Publication Data

US 2009/0141778 A1    Jun. 4, 2009

Related U.S. Application Data

(60) Provisional application No. 60/991,427, filed on Nov. 30, 2007.

(51) Int. Cl.
*H04B 1/69* (2006.01)

(52) U.S. Cl. ........ 375/150; 375/141; 375/142; 375/146; 375/147; 375/132; 370/342; 370/335; 455/67.11; 455/423

(58) Field of Classification Search ............ 375/141, 375/132, 142, 150, 146, 147; 370/342, 335; 455/67.11, 423
See application file for complete search history.

(56) References Cited

U.S. PATENT DOCUMENTS

| | | | |
|---|---|---|---|
| 5,654,982 A | 8/1997 | Goodson et al. | |
| 5,959,965 A | 9/1999 | Ohkubo et al. | |
| 5,974,094 A | 10/1999 | Fines et al. | |
| 6,456,644 B1 | 9/2002 | Ramberg et al. | |
| 7,154,875 B2 * | 12/2006 | Masui et al. | 370/342 |
| 7,154,956 B2 | 12/2006 | Molisch et al. | |
| 7,349,483 B2 | 3/2008 | Seki et al. | |
| 7,643,537 B1 * | 1/2010 | Giallorenzi et al. | 375/142 |
| 7,724,812 B2 | 5/2010 | Xia | |
| 2004/0114670 A1 * | 6/2004 | Cranford et al. | 375/132 |
| 2004/0127162 A1 * | 7/2004 | Maki et al. | 455/67.11 |
| 2009/0154589 A1 | 6/2009 | Monnerie | |
| 2009/0161732 A1 * | 6/2009 | Miller et al. | 375/141 |

OTHER PUBLICATIONS

U.S. Appl. No. 12/334,997, filed Dec. 15, 2008, Monnerie.
Chan, et al., "Comparison of Two FFT-Based Demodulation Schemes for M-ary FSK", *MILCOM '92 Conference Record 'Communications—Fusing Command, Control and Intelligence, IEEE* Oct. 11, 1992, 603-607 vol. 2.
Ferland, et al., "On the Implementation of a 32-Channel FFT-Based MFSK Demodulator", *IEEE Conference Proceeding on Electrical and Computer Engineering* Jan. 1, 1994, 186-189 vol. 1.
U.S. Appl. No. 12/334,997, Office Action mailed on Jul. 15, 2011, 14 Pages.

* cited by examiner

*Primary Examiner* — Eva Puente
(74) *Attorney, Agent, or Firm* — Kilpatrick Townsend & Stockton LLP

(57) ABSTRACT

Systems and methods are disclosed for processing at least two spread spectrum signals that at least partially overlap in time and in frequency. A main correlator bank with a trip detection component can determine a PN code phase for each of the spread spectrum signals that are associated with a PN code signal. The signals may at least partially overlap in time and in frequency. The PN code phases can be determined by comparing the signals to internally generated PN code phases. Based on the comparison, trips associated with the code phases are detected. The PN code phase for each signal can be used to extract a data signal from the signal. The data signals can be outputted.

23 Claims, 6 Drawing Sheets

| Frequency # | NCO value |
|---|---|
| 0 | F – 4*Offset |
| 1 | F – 3*Offset |
| 2 | F – 2*Offset |
| 3 | F – Offset |
| 4 | F |
| 5 | F + Offset |
| 6 | F + 2*Offset |
| 7 | F + 3*Offset |

Figure 6

SYSTEMS AND METHODS FOR PROCESSING SPREAD SPECTRUM SIGNALS

CROSS REFERENCE TO RELATED APPLICATIONS

This application claims priority to U.S. Provisional Patent Application No. 60/991,427, filed Nov. 30, 2007 and entitled "Systems and Methods for Processing Spread Spectrum Signals," the entirety of which is hereby incorporated by reference.

FIELD OF THE DISCLOSURE

The disclosure is generally directed to processing spread spectrum signals and, specifically, to methods and systems for receiving and processing multichannel spread spectrum signals that at least partially overlap in time and in frequency.

BACKGROUND

Communication systems allow information to be transmitted from one location to another via a communication medium. The communication medium may be bounded, such as a wireline medium, or unbounded, such as a wireless medium. The communication system can include (1) a transmitter that modulates information onto carrier wave(s) and transmits it on the communication medium and (2) a receiver that receives the carrier wave(s) and demodulates the signal to obtain the information. Various signal processing systems have been used to modulate information onto the carrier wave(s) and demodulate the carrier wave(s) to obtain the information.

An example of one such system is a spread spectrum communication system. Transmitted signals in spread spectrum communication systems are spread over bandwidths larger than the bandwidths needed to transmit the information to promote privacy of the information. A spread spectrum system may utilize one or more techniques to transmit information. Examples of such techniques include frequency-hopping spread spectrum, direct-sequence spread spectrum, time-hopping spread spectrum, and chirp spread spectrum.

In a direct-sequence spread spectrum (DSSS) system, the bandwidth of a transmitted signal is increased by modulating the signal onto a known pseudo-noise (PN) coded signal before modulating onto the carrier wave(s). Typically, the coded signal is a digital signal having approximately an equal number of high and low bits that maximizes the spectrum over which the signal is spread. A DSSS receiver may recover the transmitted information by demodulating the carrier wave(s) and then multiplying the resulting signal with a local replica of the PN coded signal to eliminate the PN coded signal. The DSSS technique spreads energy over a wider bandwidth and promotes information privacy since a receiver must know the PN coded sequence used in the transmission to recover transmitted information efficiently.

A spread spectrum receiver in some communication systems may be required to receive different DSSS signals. When two or more packets of information overlap each other, the receiver may be unable to process both packets of information. Accordingly, spread spectrum receivers are desirable that can receive and process two or more different signals that at least partially overlap in time and in frequency.

SUMMARY

In an embodiment, a system is provided for recovering data signals representing information from at least two spread spectrum signals that at least partially overlap in time and in frequency. The system can include a main correlator bank with a trip detection component that can determine a first PN code phase for a first spread spectrum signal associated with a pseudo-noise (PN) code signal and determine a second PN code phase for a second spread spectrum signal associated with the PN code signal. The first spread spectrum signal and the second spread spectrum signal may be recovered from a communication medium on which the first spread spectrum signal and the second spread spectrum signal are propagating and at least partially overlap in time and in frequency. The first PN code phase and the second PN code phase can be determined by comparing the first spread spectrum signal and the second spread spectrum signal to internally generated PN code phases. Based on the comparison, a first trip associated with the first PN code phase and a second trip associated with the second PN code phase are detected.

The system can include at least one general purpose correlator coupled to the main correlator bank. The at least one general purpose correlator can use the first PN code phase to extract a first data signal from the first spread spectrum signal and use the second PN code phase to extract a second data signal from the second spread spectrum signal. The system can also include a processor interface coupled to the main correlator bank and the at least one general purpose correlator. The processor interface can output the first data signal and output the second data signal.

This illustrative embodiment is mentioned not to limit or define the invention, but to provide examples to aid understanding thereof. Other aspects, advantages, and features of the present invention will become apparent after review of the entire application, including the following sections: Brief Description of the Drawings, Detailed Description, and Claims.

BRIEF DESCRIPTION OF THE DRAWINGS

FIG. 6 illustrates numerically controlled oscillator (NCO) frequency offsets used by a general purpose correlator down converter according to one embodiment of the present invention.

DETAILED DESCRIPTION

Certain aspects and embodiments of the present invention are directed to systems and methods for detecting, receiving, and processing spread spectrum signals that at least partially overlap in time and in frequency. The signals may be received from a communication medium on which the signals are propagating. Received signals can be processed to extract information. Each signal includes a packet of information that has been modulated onto a pseudo-noise (PN) code signal, or otherwise, by a transmitter. The PN code signal may be associated with a PN code phase. The PN code phase is a phase shift of the PN code signal. PN code phases of signals are matched with stored PN code phases to identify each of the received signals. The information signal can be extracted from the PN code signal identified using the PN code phases to allow information to be extracted from two or more signals that at least partially overlap in time and in frequency.

Certain embodiments of the present invention may be particularly useful in spread spectrum communication systems. One such spread spectrum communication system may include transmitters located remotely from one or more receivers that can communicate wirelessly with the receivers. The transmitters can be associated with end point devices that supply data to the transmitters to be communicated to the receiver. The data may be any type of information. An example of data includes resource consumption at utility meters, such as electricity meters located at homes and/or businesses that are utility customers. The end point devices gather data and periodically transmit the data as digital data packets to the receiver via spread spectrum techniques that can include direct sequence spread spectrum (DSSS) communication methods, among others.

The receiver can process the received signals by demodulating them to obtain data within those signals. Each of the transmitters and/or receivers can be transceivers and may be associated with additional system components that support communication techniques. A description of examples of such systems may be found in U.S. Pat. No. 6,456,644 to Ramberg et al.

One receiver may receive signals from multiple transmitters. The receiver can receive and process a first signal packet from a first transmitter and receive a second signal packet from a second transmitter that overlaps the receipt and processing of the first signal packet (or from the same transmitter that, due to communication medium delays or otherwise, overlaps the first signal packet). When two different signal packets overlap each other, in time and/or frequency, a collision occurs and the receiver may be unable to demodulate one or both signal packets due to their interference with each other. Certain embodiments of the present invention can be implemented in the receiver to allow it to receive and process two or more signals that at least partially overlap in time and in frequency, even if a collision occurs.

Figure 1:
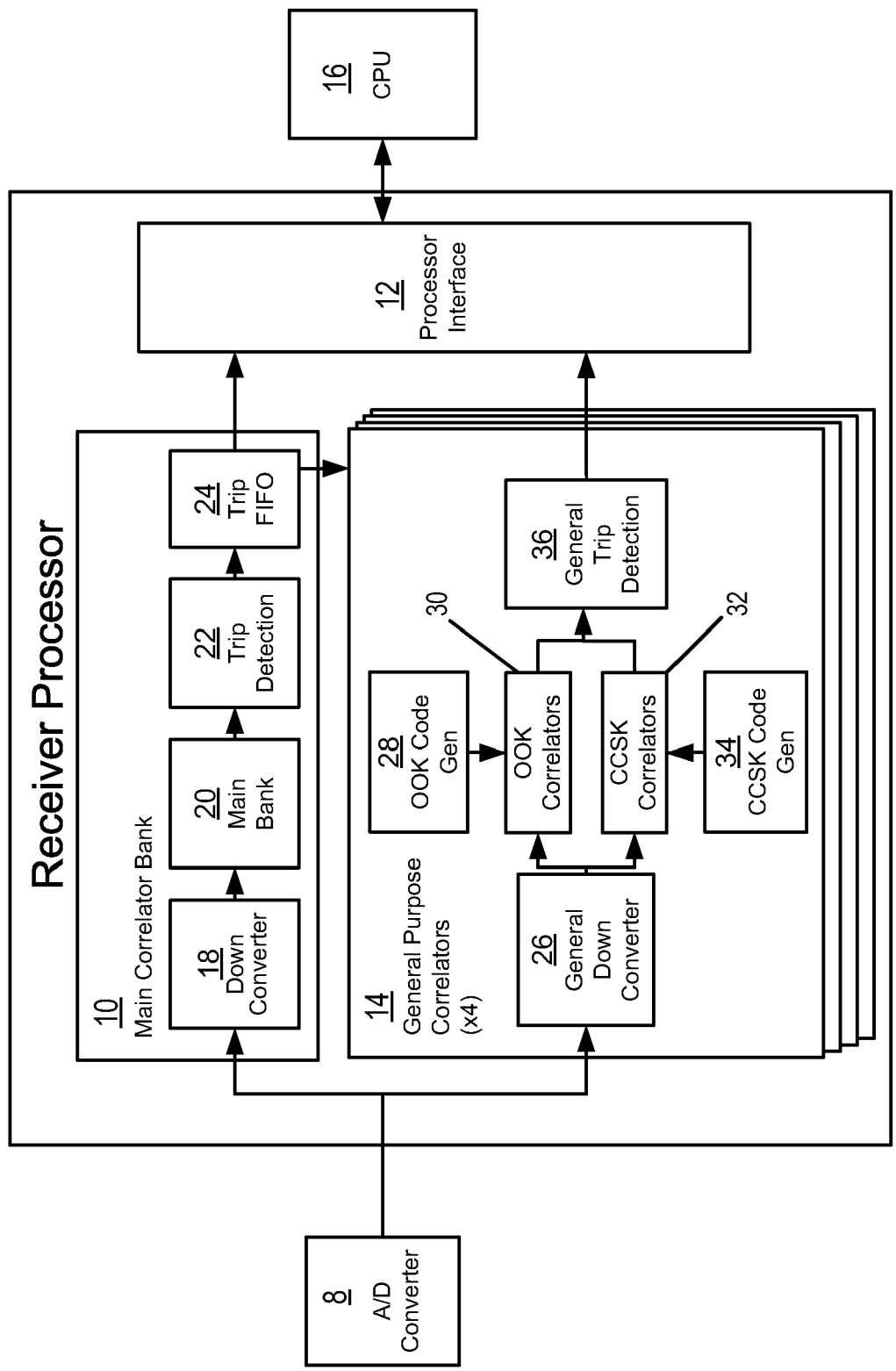
FIG. 1 is a block diagram of a receiver processor according to one embodiment of the present invention.

FIG. 1 illustrates a block diagram of a receiver processor that can be used to process signals according to one embodiment of the present invention. Receiver processors according to certain embodiments can be encased in a receiver device. For example, a receiver processor may be part of a digital signal processor or other semiconductor device that is encased in a receiver and configured to be coupled to other receiver components. The receiver processor shown in FIG. 1 includes configured circuitry disposed in a field-programmable gate array (FPGA) semiconductor device, such as an FPGA manufactured by Altera Corporation of San Jose, Calif. However, other devices can be configured to receive and process spread spectrum signals that at least partially overlap in time and in frequency.

The FPGA semiconductor device can be programmed through one or more ports, such as an active serial port and a Joint Test Action Group (JTAG) interface. The active serial port may be programmed by a dedicated flash device, such as flash device EPCS4 manufactured by Altera Corp. The JTAG interface can be controlled by an on-board microcontroller or by an external programmer. The external programmer allows the FPGA to be configured using an external personal computer. An example of the external programmer is ByteBlaster by Altera Corp. One or more software applications can be used to configure the FPGA using an on-board microcontroller. An example of one software application is JRunner by Altera Corp. in which the source code is in C programming language and can be used as a baseline to add programming capability for the FPGA and other devices. The FPGA is configured to operate at 160 MHz, but other operating speeds can be used to implement various embodiments of the present invention.

The receiver processor can be coupled to an analog-to-digital converter 8 and other receiver components for detecting signals from a communication medium and performing at least some pre-processing methods on the received signals before the receiver processor processes the received signals. A clock signal may be provided to the receiver processor, analog-to-digital converter 8, and other components to control operation speed. An example of one clock signal is a square waveform at 38.838364 MHz. The receiver processor can receive two or more signals from the analog-to-digital converter 8 that at least partially overlap in time and in frequency and process the signals to extract data contained within the signals. The system includes a main correlator bank 10 that can include one or more correlators and other components used to process the received signals. The main correlator bank 10, as explained in more detail below, can be adapted to determine the PN code signal and associated PN code phase for each received signal. The main correlator bank 10 can determine a trip for a particular PN code and its PN code phase for each received signal. A "trip" as used herein is a match of the PN code phase of a received signal to at least one internally generated PN code phase pattern stored in the receiver processor. The match can be used to identify the PN code phase of a received signal. The main correlator bank 10 can be coupled to a processor interface 12 and/or one or more general purpose correlators 14. The main correlator bank 10 can output the PN code phase for each received signal to the processor interface 12 and/or the general purpose correlators 14.

The general purpose correlators 14 can use the PN code phase determined by the main correlator bank 10 to extract a data signal within the received signal. The data signal includes data representing information gathered by the transmitter. The extracted data signal is provided to the processor interface 12 that is coupled to other components or end devices, such as a computer processor unit (CPU) 16. The processor interface 12 can provide the extracted data signal to end devices that can further process the data signal into data in a useable format or analyze the data for a particular use. For example, the processor interface 12 can be coupled to a database that stores the data, or to a server that collects and organizes the data. In some embodiments, the processor interface 12 is coupled to the CPU 16 via a memory bus and can be accessed by the CPU 16 using an address, such as a virtual or physical address.

Each of the main correlator bank 10 and the general purpose correlators 14 includes components and program code stored on a computer-readable medium in the receiver processor that perform various functions according to various embodiments of the present invention. Functions associated with each component are described below with reference to FIG. 2.

Figure 2:
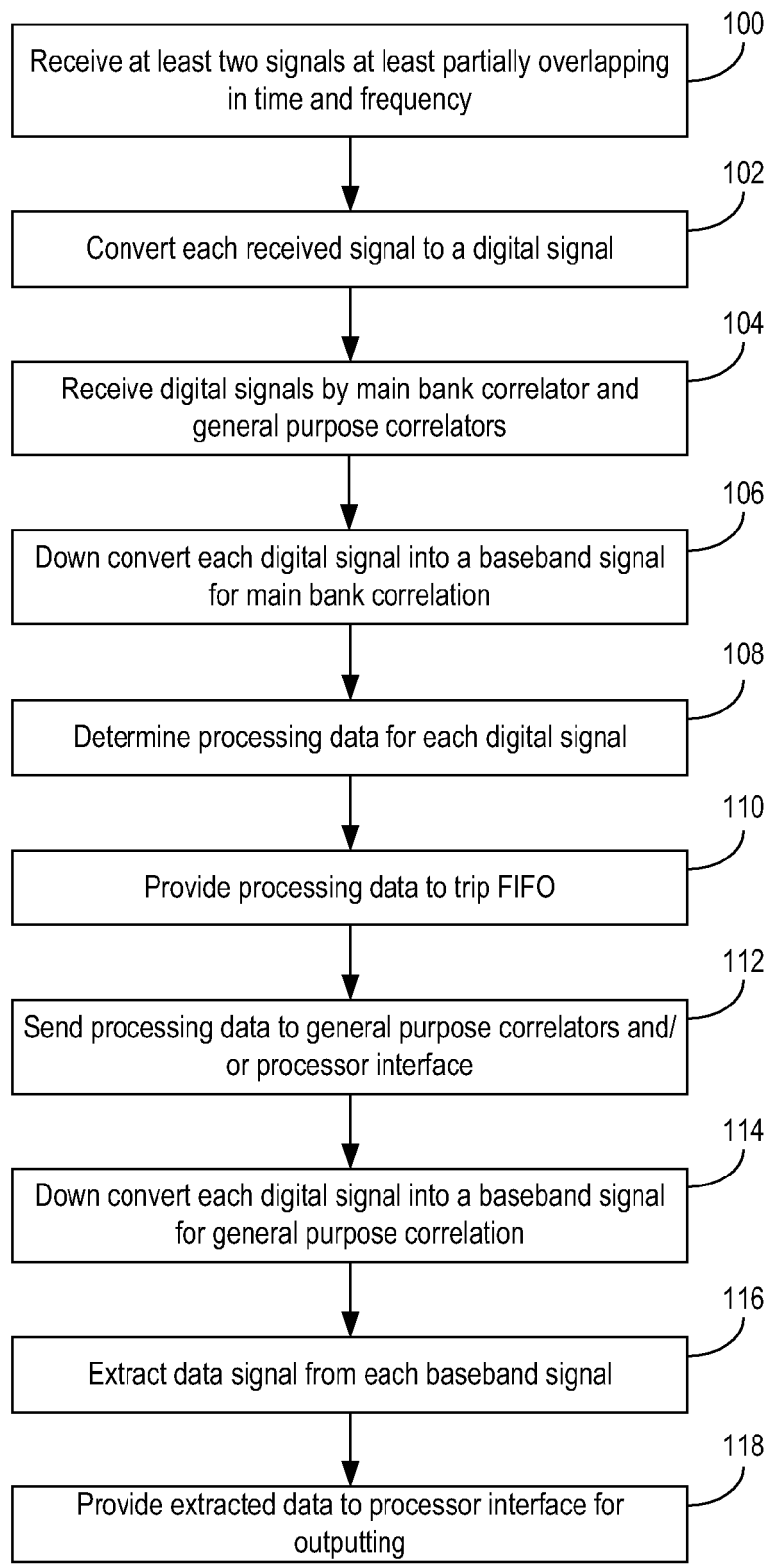
FIG. 2 is a flow chart of a method for receiving and processing at least two spread spectrum signals that at least partially overlap in time and in frequency according to one embodiment of the present invention.

FIG. 2 illustrates a method for processing received signals that at least partially overlap in time and in frequency using a PN code phase of each of the signals according to one embodiment of the present invention. The method begins at block 100 when at least two signals are received that at least partially overlap in time and in frequency. The signals may have been transmitted at different points in time or at the same point in time from the same transmitter or different transmitters. The beginning of the at least two signals may be received at different points in time, but the at least two signals may overlap each other at least partially in time and in frequency.

Figure 3:
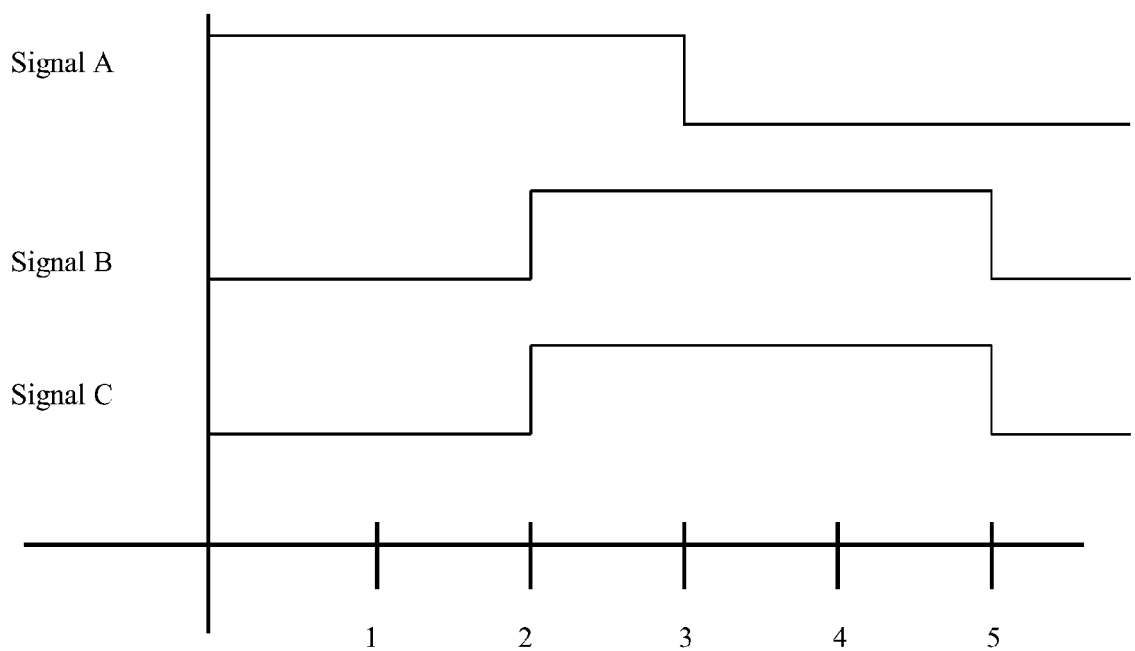
FIG. 3 graphically illustrates received signals that at least partially overlap in time according to one embodiment of the present invention.

FIG. 3 illustrates three signals received that at least partially overlap in time. Signal A is received starting at time ("t")=0 and continuing until t=3. Signal B and Signal C are received starting at t=2 and continuing until t=5. The three signals (Signals A, B, and C) at least partially overlap in time since the reception and processing of each signal overlaps with the other two signals at least at t=2 to t=3. Certain embodiments of the present invention can be used to process the received signals at the same time. The three signals shown in FIG. 3 may also have the same frequency or have frequency characteristics that at least partially overlap.

Each signal can include a packet of data represented by a data signal modulated onto a PN code signal and carrier wave(s). Each signal may also include a PN code phase that represents a phase shift associated with the transmitted signal. Two or more signals can include the same PN code signal, but include different PN code phases. In some embodiments of the present invention, a PN code signal having sixty-three chips may be used. A chip can represent a pulse of a direct-sequence spread spectrum signal.

Returning to FIG. 2, an analog-to-digital converter converts each of the received signals into a digital signal in block 102. For example, the analog-to-digital converter can sample the received signal at a pre-determined rate to generate a digital signal that represents the received signal. The pre-determined rate may be a sampling rate that can be used in further signal processing.

In block 104, the digital signals are received by both the main correlator bank 10 and the general purpose correlators 14. The digital signals can be received by the main correlator bank 10 and general purpose correlators 14 at the same time. In some embodiments, the digital signals are received by the main correlator bank 10 first. After the main correlator bank 10 complete processing, the digital signals are received by the general purpose correlators 14.

In block 106, the main correlator bank 10 can include a down converter component 18 that down converts each received digital signal into a baseband quadrature signal. Each digital signal may be down converted by any method. For example, frequency shifting, or other common signal manipulation techniques, may be used to down convert signals. One method uses one or more numerically controlled oscillators (NCOs) to provide an intermediate frequency signal with which the digital signal is down converted to a secondary signal that is a baseband signal around zero frequency. In some embodiments, a center frequency for the down-conversion is ¼ of the sampling rate of the analog-to-digital converter. The NCO can be programmed to try different frequency offsets around the center frequency to account for frequency drifts due to transmitter age or otherwise. The output of the down conversion may be a complex DC signal having phase shifts for each digital signal phase change. Down converted signals may be provided to a main bank component 20 in the main correlator bank 10 for storage or otherwise for further processing. The general purpose correlators 14 can include a general down converter component 26 that can down convert the received signals at the same time or a different time than the down converter component 18 using the same or similar down conversion methods. Other down conversion methods can include converting the received signals to secondary signals at a selected frequency, such as an intermediate frequency or otherwise.

In block 108, the main correlator bank 10 can include a trip detection component 22 that can correlate the digital signals to PN code signals and PN code phases. The trip detection component 22 may use stored PN code signals that are sequences or patterns of possible PN code signals to search the baseband signals and determine an alignment of the PN code signals with the baseband signal. The trip detection component 22 can align the baseband signal with one or more internally generated patterns that correspond to possible PN code signals. The internally generated patterns may be patterns of possible PN code phases and PN code signals that are stored in the receiver processor.

One or more possible PN code phases for each PN code signal is also internally generated and compared to the baseband signal. A trip is indicated when the baseband signal is aligned with at least one of the possible PN code signals and at least one of the possible PN code phases. In some cases, the alignment may not be exact and the trip detection component 22 can identify a trip when a close alignment occurs that produces a trip magnitude having a value greater than a pre-set threshold. For example, the trip magnitude may increase as the alignment becomes closer.

Figure 4:
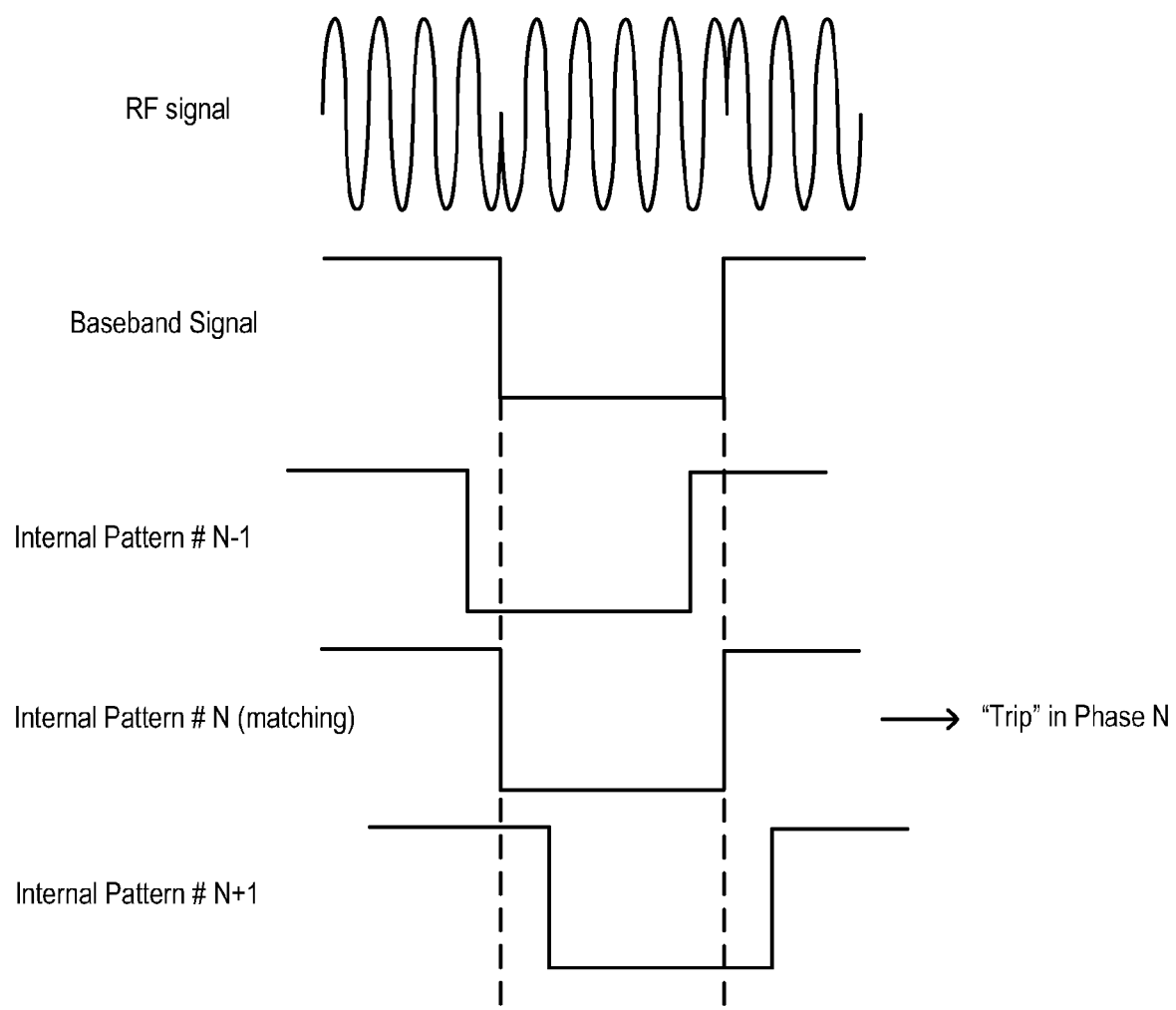
FIG. 4 graphically illustrates trip detection of baseband signals from down converted received signals according to one embodiment of the present invention.

FIG. 4 illustrates signals when a trip is determined for a received signal according to one embodiment of the present invention. The received signal is shown in FIG. 4 as an RF signal. After down conversion, the RF signal may be a baseband signal that changes magnitude each time a phase shift occurs in the RF signal. Phase shifts may correspond to the PN code signal included with the RF signal. Two received signals may have the same PN code signal, but more likely have a different phase shift corresponding to the PN code signal. The trip detection component 22 can select one or more internally generated patterns that correspond to the PN code signal, but have different PN code phases. The internally generated patterns are shown in FIG. 4 as "Internal Pattern # N−1," "Internal Pattern # N" and "Internal Pattern # N+1." Each corresponds to a PN code phase of the same PN code signal. The PN code phases represent phase shifts of the same PN code signal. When the trip detection component 22 determines that an internally generated pattern, including a PN code phase, matches the baseband signal and code phase, a trip is detected. Using trip detection, PN code phase can be identified for two or more signals that at least partially overlap in time and in frequency. In some embodiments of the present invention, 126 correlators in the main bank component 20 may be used to correlate received signals.

Returning to FIG. 2, a trip first-in-first-out (FIFO) 24 receives and stores processing data in block 110. The processing data can include identification of the trip, the NCO frequency used, the matching PN code phase for each baseband signal, and the sampling rate. The trip FIFO 24 may store more than one detected trip. For example, the trip FIFO 24 may be configured to store up to four trips, or otherwise any number of trips. When a trip is detected for a signal, the NCO frequency and the code phase of the matching internally generated pattern, along with the detected trip, are stored in an entry in the trip FIFO 24. The remaining entries of the trip FIFO 24 can be used to store other detected trips and associated information for the detected signal(s).

In some embodiments, more than one trip may be detected for a signal. Trip FIFOs according to certain embodiments can be configured to store a trip for a signal that is a best match. A trip may be a best match if its correlation magnitude is greater than a pre-set threshold or otherwise its correlation magnitude is the highest correlation magnitude compared to other detected trips for the signal. Various methods can be used by trip detection components according to various embodiments to select a trip having the best match for a signal. One method is illustrated in FIG. 5.

Figure 5:
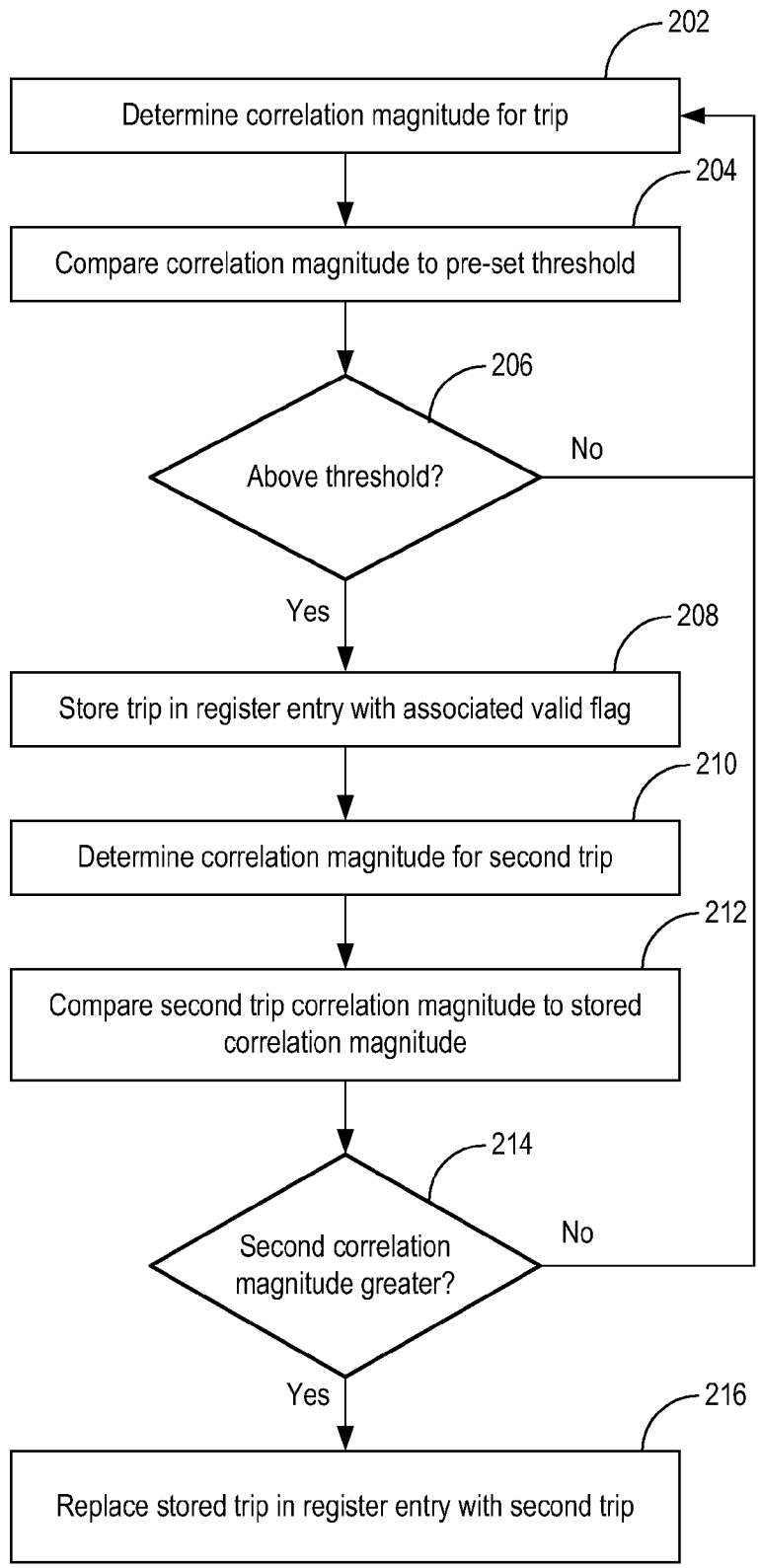
FIG. 5 is a flow chart of a method for detecting one or more trips for a signal according to one embodiment of the present invention.

In block 202 of FIG. 5, a correlation magnitude for a detected trip is determined. The correlation magnitude may be a value representing the closeness of a signal to an internally generated PN code phase pattern. For example, higher correlation magnitudes can represent that the signal is almost an exact match to an internally generated PN code phase pattern. Lower correlation magnitudes can represent the presence of differences between the signal and the internally generated PN code phase pattern. The correlation magnitude can be determined by comparing the signal to the closest internally generated PN code phase pattern, identifying the differences between the signal and the closest internally generated PN code phase pattern, assigning a value to each identified difference, and subtracting each value from a starting magnitude of an exact match.

In block 204, the correlation magnitude is compared to a pre-set threshold. The pre-set threshold may be adjustable to reflect operating preferences. For example, a relatively low pre-set threshold may be selected for operating environments that may distort signals significantly. A relatively high pre-set threshold may be selected if better correlation and more exact matches are desired, or if an operating environment does not distort signals significantly.

In block 206, the system determines if the correlation magnitude is above the pre-set threshold. If the correlation magnitude is not above the pre-set threshold, the system discards the trip and returns to block 202 to determine a correlation magnitude for another trip. The system can also determine whether trip detection should continue for a signal before returning to block 202. For example, if the entire signal has been scanned for trips, the system may end trip detection. In some embodiments, the trip is stored in the trip FIFO 24 even if its correlation magnitude is less than the pre-set threshold. A flag that represents the trip is invalid may be associated with the stored trip. If the correlation magnitude is above the pre-set threshold, the trip and its associated information is stored in a register entry in the trip FIFO 24 with a flag representing that it is a valid trip in block 208.

In block 210, a correlation magnitude for a second detected trip for a signal is determined. The correlation magnitude for the second detected trip may be determined using the same methods for determining the correlation magnitude of the first detected trip.

The correlation magnitude for the second detected trip is compared to the correlation magnitude of the stored trip in block 212. The comparison can include determining the greater of the two correlation magnitudes. The system determines whether the second correlation magnitude is greater than the stored correlation magnitude in block 214. If the second correlation magnitude is not greater than the stored correlation magnitude, the system returns to block 202 to detect additional trips for a signal. The system may also determine whether trip detection should continue before returning to block 202.

If the second correlation magnitude is greater than the stored correlation magnitude, the stored trip is replaced with the second detected trip and its associated information in the register entry in block 216. The process can continue until the system determines that trip detection for a signal is complete. After the signals are provided to the general purpose correlators 14 for further processing to extract data, the trip FIFO 24 can be flushed.

Returning to FIG. 2, the trip FIFO 24 sends the processing data to the general purpose correlators 14 to support extraction of the data signal within the received signal and to a processor interface 12 to support further processing of the received signal in block 212. The processor interface 12 may be coupled to an end device that is adapted to analyze the data or to collect a number of packets with data to form a larger data set. In some embodiments of the present invention, the processing data is supplied to the processor interface 12 and the processor interface 12 then provides the processing data, or part of the processing data, to the general purpose correlators 14.

In block 114, the general purpose correlators 14 include a general down converter component 26 that can down convert the received digital signals using one or more NCO frequencies. The general purpose correlators 14 may include a number of correlators that can operate in parallel to extract data from two or more received signals. The general purpose correlators 14 include four correlators, but any number of correlators may be used. In one embodiment, each of the down converter components 26 of the general purpose correlators 14 that are actively processing signals can use eight NCO frequencies at the same time or overlapping times. A center frequency is received from the correlators of the main correlator bank 10 and used as a first NCO frequency. Seven offset frequencies around the center frequency may be used. FIG. 6 illustrates a chart of NCO frequencies that may be used by the general purpose correlator down converter component 26. The center frequency is shown as F. Seven frequencies may surround the center frequency F and include an offset of higher or lower frequencies relative to the center frequency F. Using offset frequencies during down conversion can facilitate detection of center frequency fluctuations or jitter that may occur during transmission. For example, the center frequency may be offset from an expected center frequency due to defects introduced by the transmitter or by the communication medium. Once the true center frequency is determined, the received signal may be down converted to a baseband signal for further processing and provided to correlators that are included in the general purpose correlators 14.

In block 116, the general purpose correlators 14 correlate the baseband signals to extract a data signal from the baseband signals. The baseband signals may be correlated using any method. In some embodiments, the methods used to correlate the baseband signals depend, in part, on the type of packet format used to transmit the data. Examples of packet formats that may be used include on/off keying (OOK) format and cyclic code shift keying (CCSK) format. The extracted data signal may be a string of 1s and 0s that digitally represent the transmitted data.

When signals having OOK formats are received, OOK correlators 30 supported by OOK code generators 28 may be used to extract a data signal. OOK formats include a preamble and a payload, each including bits in the same format. The OOK correlators 30 receive a center PN code phase from the main bank trip FIFO 24 that was determined for the signal the OOK correlators 30 are processing. The OOK correlators 30 can scan the baseband signal around the center frequency and the center PN code phase that was received from the trip FIFO 24 using data received, for example, for the OOK code generators 28. A maximum correlation magnitude is determined by the OOK correlators 30 and used to extract the bit value from each baseband signal. For example, the OOK correlators 30 may remove the PN code signal from the baseband signal and measure the magnitude of the bits of data to determine whether it is a digital 1 or a digital 0. If the magnitude of the bit is above a pre-set threshold magnitude, a digital 1 is assigned to the data. If the magnitude of the bit is below a pre-set threshold magnitude, a digital 0 is assigned to the data.

In some embodiments, twenty-four OOK correlators 30 are used. The twenty-four correlators may be arranged in a matrix of three correlation phases and eight different offset frequencies. The correlation phases can include: (1) a programmable code phase value from the trip FIFO 24; (2) the programmable code phase value minus a pre-selected offset from, for example, one of the OOK code generators 28; and (3) the programmable code phase value plus the pre-selected offset from, for example, one of the OOK code generators 28. The twenty-four OOK correlators can be configured to scan around a center frequency and center code phase to provide an output that is a maximum correlation magnitude among the twenty-four OOK correlators 30.

When signals having CCSK formats are received, CCSK correlators 32 supported by CCSK Code Generators 34 may be used to extract a data signal. CCSK formats may include a preamble including data in a first format and a payload including data in a second format. The first format may be one bit per PN code. The second format may be one symbol per PN code. Each symbol may include one or more bits. For example, each symbol may include four bits. The CCSK correlators 32 extract data within the baseband signal. In some embodiments of the present invention, the CCSK correlators 32 receive a PN code phase from the trip FIFO 24 that corresponds to the signals that the CCSK correlators 32 are processing. The CCSK correlators 32 may align a PN signal from, for example, the CCSK code generators 34 having the received PN code phase with the baseband signal and use it to remove the PN signal from each baseband signal. In one embodiment, the PN signal may be removed by multiplying the baseband signal by a PN signal with a matching PN code phase. In some embodiments of the present invention, the OOK correlators 30 may be used to extract CCSK data signal preambles from each baseband signal, and CCSK correlators 32 are used to extract data signal payloads from each baseband signal.

In block 118, the general purpose correlators 14 provide the extracted data and bit information to the processor interface 12 for outputting. In some embodiments, the general purpose correlators 14 include a general trip detection component 36 that can further processing the extracted data, such as by confirming trip detection or otherwise perform a quality control check on the extracted data using information, for example, from the main correlator bank 10 or otherwise. The processor interface 12 may be adapted to analyze and/or collect the data. In some embodiments, the processor interface 12 is configured to output the data to an output device, such as a display or database that stores the extracted data. In other embodiments, the processor interface can output the data to a component, such as CPU 16, that interfaces with an output device that is a display or database that stores the extracted data.

Certain optional performance advantages can be achieved using some embodiments of the present invention. These optional performance advantages can include processing signals that at least partially overlap in time and in frequency, such as any number of signals that are two or more signals, each containing packets of information, improved sensitivity for signals experiencing frequency jitter by monitoring adjacent frequencies, and decreasing false trip detections using PN code phase trip detection.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope.

We claim:

1. A system for recovering data signals representing information from at least two spread spectrum signals that at least partially overlap in time and in frequency, the system comprising:
   a main correlator bank comprising a trip detection component configured to determine a first PN code phase for a first spread spectrum signal associated with a pseudo-noise (PN) code signal and determine a second PN code phase for a second spread spectrum signal associated with the PN code signal, the first spread spectrum signal and the second spread spectrum signal being recovered from a communication medium on which the first spread spectrum signal and the second spread spectrum signal are propagating and are at least partially overlapping in time and in frequency, the first PN code phase and the second PN code phase being determined by comparing the first spread spectrum signal and the second spread spectrum signal to a plurality of internally generated PN code phases and detecting a first trip associated with the first PN code phase and a second trip associated with the second PN code phase;
   at least one general purpose correlator coupled to the main correlator bank, the at least one general purpose correlator being configured to use the first PN code phase to extract a first data signal from the first spread spectrum signal and use the second PN code phase to extract a second data signal from the second spread spectrum signal; and
   a processor interface coupled to the main correlator bank and the at least one general purpose correlator, the processor interface being configured to output the first data signal and output the second data signal.

2. The system of claim 1, wherein the main correlator bank is configured to frequency shift the first spread spectrum signal to a first secondary signal and frequency shift the second spread spectrum signal to a second secondary signal.

3. The system of claim 2, wherein the first secondary signal is a first baseband quadrature signal and the second secondary signal is a second baseband quadrature signal, the trip detection component being configured to:
   detect the first trip associated with the first PN code phase by comparing the first baseband quadrature signal to the plurality of internally generated PN code phases; and
   detect the second trip associated with the second PN code phase by comparing the second baseband quadrature signal to the plurality of internally generated PN code phases.

4. The system of claim 3, wherein the main correlator bank comprises a trip FIFO configured to store the first trip and the second trip.

5. The system of claim 3, wherein the trip detection component is configured to detect the first trip for the first baseband quadrature signal based on the comparison of the first baseband quadrature signal to the plurality of internally generated PN code phases by:
   generating a trip correlation magnitude for the first trip by comparing the first baseband quadrature signal to at least one of the plurality of internally generated PN code phases; and determining the trip correlation magnitude exceeds a pre-set threshold.

6. The system of claim 1, wherein the at least one general purpose correlator is configured to extract the first data signal from the first spread spectrum signal based at least in part on a signal format of the first spread spectrum signal.

7. The system of claim 6, wherein the signal format of the first spread spectrum signal is an on/off keying (OOK) format, the at least one general purpose correlator comprising a OOK correlator configured to extract the first data signal by:
  removing the PN code signal from the first spread spectrum signal;
  determining a correlation magnitude for the first spread spectrum signal; and
  using the correlation magnitude to determine the first data signal.

8. The system of claim 6, wherein the signal format of the first spread spectrum signal is a cyclic code shift keying (CCSK) format, the at least one general purpose correlator comprising a CCSK correlator configured to extract the first data signal by aligning the first PN code phase with the first spread spectrum signal.

9. A method for recovering data signals representing information from at least two spread spectrum signals that at least partially overlap in time and in frequency, the method comprising:
  receiving a first spread spectrum signal associated with a pseudo-noise (PN) code signal and a second spread spectrum signal associated with the PN code signal, the first spread spectrum signal and the second spread spectrum signal being recovered from a communication medium on which the first spread spectrum signal and the second spread spectrum signal are propagating and at least partially overlap in time and in frequency;
  determining a first PN code phase for the first spread spectrum signal and a second PN code phase for the second spread spectrum signal by:
    comparing the first spread spectrum signal and the second spread spectrum signal to a plurality of internally generated PN code phases; and
    detecting a first trip associated with the first PN code phase and detecting a second trip associated with the second PN code phase;
  using the first PN code phase to extract a first data signal from the first spread spectrum signal and using the second PN code phase to extract a second data signal from the second spread spectrum signal, the first data signal and the second data signal representing different data; and
  outputting the first data signal and the second data signal.

10. The method of claim 9, further comprising:
  frequency shifting the first spread spectrum signal to a first secondary signal; and
  frequency shifting the second spread spectrum signal to a second secondary signal.

11. The method of claim 10, wherein the first secondary signal is a first baseband quadrature signal and the second secondary signal is a second baseband quadrature signal; and
  wherein detecting the first trip associated with the first PN code phase and detecting the second trip associated with the second PN code phase comprises:
    comparing the first baseband quadrature signal to the plurality of internally generated PN code phases to detect the first trip; and
    comparing the second baseband quadrature signal to the plurality of internally generated PN code phases to detect the second trip.

12. The method of claim 11, wherein detecting the first trip associated with the first PN code phase and detecting the second trip associated with the second PN code phase further comprises:
  generating a first trip correlation magnitude for the first trip by comparing the first baseband quadrature signal to at least one of the plurality of internally generated PN code phases and determining the first trip correlation magnitude exceeds a pre-set threshold; and
  generating a second trip correlation magnitude for the second trip by comparing the second baseband quadrature signal to at least one of the plurality of internally generated PN code phases and determining the second trip correlation magnitude exceeds the pre-set threshold.

13. The method of claim 12, further comprising:
  storing the first trip in a trip FIFO, the first trip being associated with the first spread spectrum signal; and
  storing the second trip in a trip FIFO, the second trip being associated with the second spread spectrum signal.

14. The method of claim 10, wherein using the first PN code phase to extract the first data signal from the first spread spectrum signal and using the second PN code phase to extract the second data signal from the second spread spectrum signal comprises:
  extracting the first data signal based in part on a signal format of the first spread spectrum signal; and
  extracting the second data signal based in part on the signal format of the second spread spectrum signal.

15. The method of claim 14, wherein the signal format of the first signal format of the first spread spectrum signal is an on/off keying (OOK) format, extracting the first data signal based in part on the signal format of the first spread spectrum signal comprising:
  removing the PN code signal from the first spread spectrum signal;
  determining a correlation magnitude for the first spread spectrum signal by:
    determining a frequency magnitude for a plurality of frequencies around a center frequency associated with the first spread spectrum signal;
    determining a code magnitude around a center PN code phase associated with the first spread spectrum signal; and
    using the frequency magnitude and the code magnitude to determine the correlation magnitude; and
  using the correlation magnitude to determine the first data signal.

16. The method of claim 14, wherein the signal format of the first spread spectrum signal is a cyclic code shift keying (CCSK) format, extracting the first data signal based in part on the signal format of the first spread spectrum signal comprising:
  aligning the first PN code phase with the first spread spectrum signal.

17. A non-transitory computer-readable medium on which program code is stored, the program code comprising:
  program code for receiving a first spread spectrum signal associated with a pseudo-noise (PN) code signal and a second spread spectrum signal associated with the PN code signal, the first spread spectrum signal and the second spread spectrum signal being recovered from a communication medium on which the first spread spectrum signal and the second spread spectrum signal are propagating and are at least partially overlapping in time and in frequency;

program code for determining a first PN code phase for the first spread spectrum signal and a second PN code phase for the second spread spectrum signal, comprising:
  program code for comparing the first spread spectrum signal and the second spread spectrum signal to a plurality of internally generated PN code phases; and
  program code for detecting a first trip associated with the first PN code phase and detecting a second trip associated with the second PN code phase;
program code for using the first PN code phase to extract a first data signal from the first spread spectrum signal and using the second PN code phase to extract a second data signal from the second spread spectrum signal; and
program code for outputting the first data signal and the second data signal.

18. The non-transitory computer-readable medium of claim 17, further comprising:
  program code for frequency shifting the first spread spectrum signal to a first secondary signal; and
  program code for frequency shifting the second spread spectrum signal to a second secondary signal.

19. The non-transitory computer-readable medium of claim 18, wherein the first secondary signal is a first baseband quadrature signal and the second secondary signal is a second baseband quadrature signal; and
  wherein program code for detecting the first trip associated with the first PN code phase and detecting the second trip associated with the second PN code phase comprises:
    program code for comparing the first baseband quadrature signal to the plurality of internally generated PN code phases to detect the first trip; and
    program code for comparing the second baseband quadrature signal to the plurality of internally generated PN code phases to detect the second trip.

20. The non-transitory computer-readable medium of claim 19, wherein program code for detecting the first trip associated with the first PN code phase and detecting the second trip associated with the second PN code phase further comprises:
  program code for generating a first trip correlation magnitude for the first trip by comparing the first baseband quadrature signal to at least one of the plurality of internally generated PN code phases and determining the first trip correlation magnitude exceeds a pre-set threshold; and
  program code for generating a second trip correlation magnitude for the second trip by comparing the second baseband quadrature signal to at least one of the plurality of internally generated PN code phases and determining the second trip correlation magnitude exceeds the pre-set threshold.

21. The non-transitory computer-readable medium of claim 17, wherein program code for using the first PN code phase to extract the first data signal from the first spread spectrum signal and using the second PN code phase to extract the second data signal from the second spread spectrum signal comprises:
  program code for extracting the first data signal based in part on a signal format of the first spread spectrum signal; and
  program code for extracting the second data signal based in part on the signal format of the second spread spectrum signal.

22. The non-transitory computer-readable medium of claim 20, wherein the signal format of the first signal format of the first spread spectrum signal is an on/off keying (OOK) format, program code for extracting the first data signal based in part on the signal format of the first spread spectrum signal comprising:
  program code for removing the PN code signal from the first spread spectrum signal;
  program code for determining a correlation magnitude for the first spread spectrum signal comprising:
    program code for determining a frequency magnitude for a plurality of frequencies around a center frequency associated with the first spread spectrum signal;
    program code for determining a code magnitude around a center PN code phase associated with the first spread spectrum signal; and
    program code for using the frequency magnitude and the code magnitude to determine the correlation magnitude; and
  program code for using the correlation magnitude to determine the first data signal.

23. The non-transitory computer-readable medium of claim 20, wherein the signal format of the first spread spectrum signal is a cyclic code shift keying (CCSK) format, program code for extracting the first data signal based in part on the signal format of the first spread spectrum signal comprising:
  program code for aligning the first PN code phase with the first spread spectrum signal.

\* \* \* \* \*